Feb. 26, 1957 — J. R. PARSONS ET AL — 2,782,597
COMBUSTION CHAMBER HAVING IMPROVED AIR INLET MEANS
Filed March 15, 1952
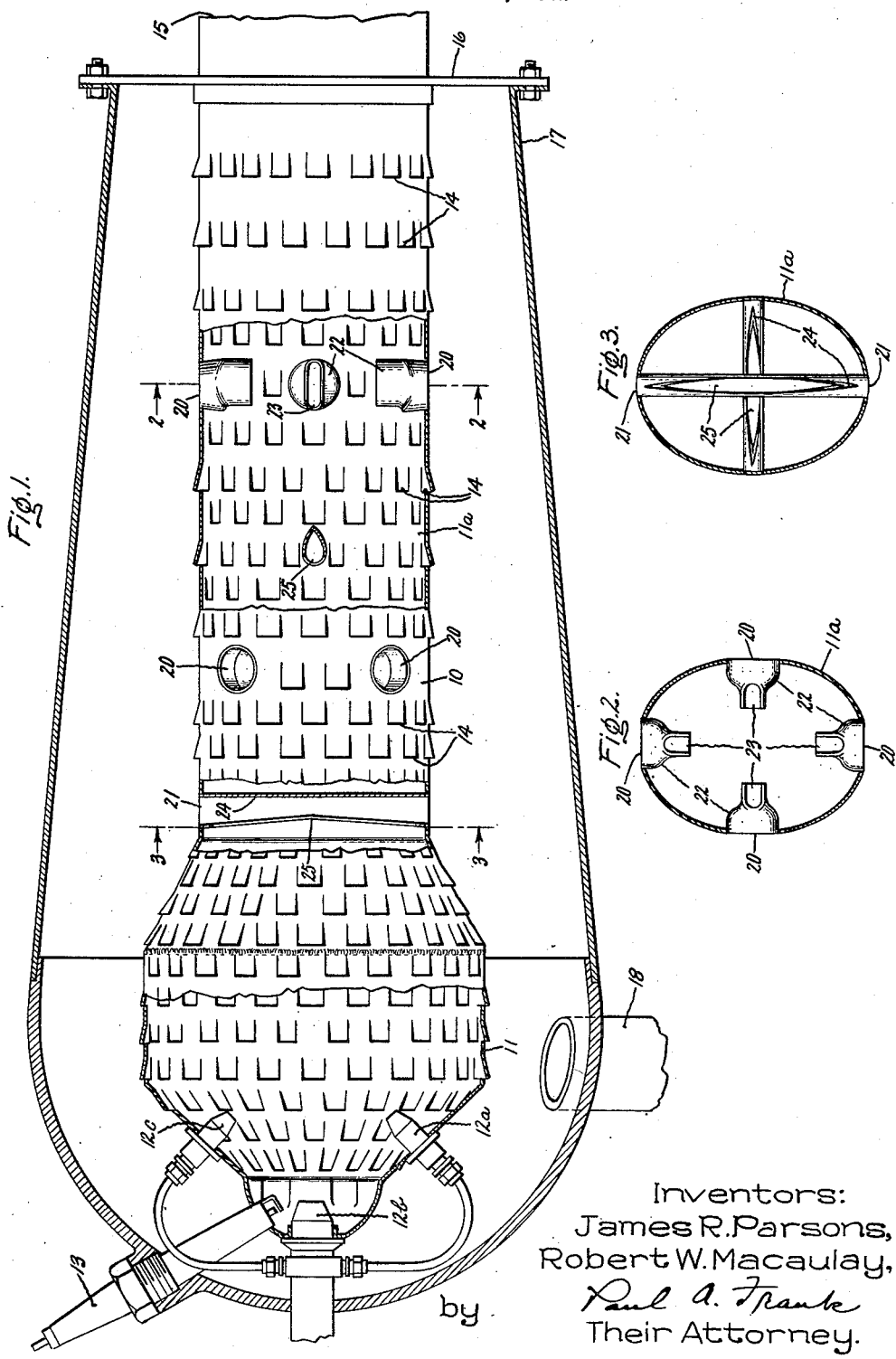
Inventors:
James R. Parsons,
Robert W. Macaulay,
by Paul A. Frank
Their Attorney.

2,782,597
COMBUSTION CHAMBER HAVING IMPROVED AIR INLET MEANS

James R. Parsons and Robert W. Macaulay, Scotia, N. Y., assignors to General Electric Company, a corporation of New York Application March 15, 1952, Serial No. 276,842

4 Claims. (Cl. 60—39.65)

This invention relates to combustion chambers and, in particular, to an improved structure for a combustion chamber of the type used in jet engines and gas turbines.

The combustion chamber of a jet engine or gas turbine is subjected to such rigorous operating conditions that the development of the art has depended to a large extent upon the development of satisfactory combustion chambers. To meet operating requirements, a combustion chamber should provide a flame of relatively short length, should have a high fuel efficiency over as large a temperature range as possible, should have a long life and the combustor should be easy to ignite and provide a stable flame.

It is an object of this invention to provide a combustion chamber having a high rating with regard to all operating requirements.

It is another object of this invention to provide a combustion chamber wherein a plurality of fuel injectors are combined with means for bringing air into intimate admixture with the fuel to produce a combustion chamber wherein the flame length and combustion temperature may be readily controlled while achieving efficient combustion.

It is a further object of the invention to provide a combustion chamber wherein a plurality of fuel injectors cooperate with a plurality of air inlet ducts or tubes to bring about complete combustion of the fuel.

Broadly stated, the invention comprises an elongated tubular shell having an enlarged fuel inlet end in which a plurality of fuel injectors are positioned and a plurality of apertures in the shell for admitting combustion-supporting air. A tube secured across each aperture and leading to the interior of the chamber has a longitudinal slot opening toward the injection end of the chamber to provide air near the longitudinal axis of the combustion chamber while at the same time obtaining sufficient cooling effect from the air to avoid burnout of the air tubes as a result of contact with the combustion flame.

Further objects and advantages of this invention will become apparent from a perusal of the following specification considered in conjunction with the accompanying drawing wherein:

Fig. 1 is a view partly in section of a combustion chamber showing the fuel injection section and air inlet apertures of this invention;

Fig. 2 is a view of the combustion taken along the lines 2—2 of Fig. 1; and

Fig. 3 is a sectional view taken along the lines 3—3 of Fig. 1.

Referring to Fig. 1, the combustion chamber has a wall structure 10 composed of heat-resistant metal. In the embodiment shown, the combustion chamber has an enlarged primary section 11 with an ovular cross-sectional configuration and a secondary section 11a. This provides a flat contour which is desirable in many installations. However, a circular or other configuration would give equally satisfactory operation. Near one end of the combustion chamber, three fuel injector nozzles 12a to 12c extend through the wall structure 10. An igniter 13 is positioned in the primary section 11 for initiating combustion within the chamber.

The wall structure 10 is provided with a plurality of louvers 14 which are symmetrically spaced throughout the wall structure. Each louver 14 is a thin slit through which air may pass. The louvers are so positioned as to provide admission of a film of air that completely envelopes the inner wall of the wall structure 10, thereby keeping it relatively cool. The louvers 14 are also a source of secondary air for supporting combustion and diluting the primary gases within the chamber.

The secondary section 11a of the combustion chamber has an outlet end terminating in a thrust nozzle 15. A flange 16 is positioned between the thrust nozzle 15 and forward portion of the combustion chamber and serves as a means for securing the wall structure 10 within a housing 17. A conduit 18 leading into the housing 17 serves as a means for introducing compressed air to the annular space between the housing 17 and wall structure 10.

During operation, the space between the wall structure 10 and housing 17 is filled with compressed air. The louvers 14 admit this compressed air to the space immediately adjoining the interior of the combustion chamber. In order to furnish combustion-supporting air near the longitudinal axis of the chamber, the wall structure 10 is provided with a number of rather large apertures 20 and 21. Attached to each aperture 20 is a stub tube 22 which extends a short distance into the combustion chamber as shown in Fig. 2. The stub tubes 22 illustrated have a larger intake than outlet. While this design is not necessary in carrying out this invention, the slight nozzle effect achieved by constricting the exit portion of the tube imparts a thrust to the combustion-supporting air which carries it toward the center of the combustion chamber. The interior end of the stub tube 22 has a longitudinal slot 23 extending in the direction of the wall structure 10 and opening toward the fuel inlet end of the combustion chamber.

The combustion air apertures 21 are positioned on the wall structure 10 across the longitudinal axis of the combustion chamber from each other. Secured between each pair of apertures 21 is a hollow strut 24. Each strut 24 has a longitudinal slot 25 opening toward the fuel inlet end of the combustion chamber in a manner outlined above for the stub tubes 22. The struts 24 thus not only supply combustion air to the center of the combustion chamber but also provide wall support, thereby enabling the wall structure 10 to be thinner than it would have to be in the absence of the struts 24. The struts 24 are preferably of streamlined cross-sectional configuration in order to interfere as little as possible with the flow of gases through the combustion chamber. The struts 24 may also have their longitudinal slots a little wider in the central portion, thereby directing more combustion-supporting air along the longitudinal axis of the combustion chamber. Thus, the air feed pattern of the struts 24 is different from that of the stub tubes 22 and the two may be positioned to supplement each other, thereby increasing the efficiency of combustion.

For best operating results, each of the fuel nozzles 12a to 12c is maintained at the pressure for which it was designed. Therefore, the fuel feed through each nozzle is preferably maintained constant. However, in spite of a wide variation from the ideal in fuel feed rates, excellent combustion efficiency may be obtained.

The operating temperature of a combustion chamber is dependent upon the amount of fuel and air that is burned in it. By cutting in or cutting out the fuel nozzles 12a to 12c, the temperature of operation of the chamber is controllable over a wide range to produce a predetermined temperature and thrust. In the operation of our improved combustion chamber, the ignition takes place when a quantity of fuel is supplied to the primary section dome 11 through the nozzle 12b and the igniter 13 is actuated. Our invention provides a combustion chamber which will operate successfully over a wide range of fuel-to-air ratios.

By combining multiple fuel nozzles, an enlarged primary section, and air ducts in the secondary section, we have provided a combustion chamber having a maximum average discharge temperature in excess of 3000° F. At the same time, we have provided a combustion chamber giving a combustion efficiency of 90 percent or better for a temperature range of 200° F. to 2800° F. By having a plurality of nozzles we provide better fuel drop size distribution. The primary section provides a large space of low velocity for primary combustion which permits longer reaction time between the fuel and air before they pass to the secondary section. The air ducts provide the intimate admixture of fuel and air along the longitudinal axis of the combustion chamber, thereby insuring complete combustion.

While the present invention has been described with reference to a particular embodiment, it will be understood that numerous modifications may be made by those skilled in the art without actually departing from the invention. Therefore, we aim in the appended claims to cover all such equivalent variations as come within the true spirit and scope of the foregoing disclosure.

What we claim as new and desire to secure by Letters Patent of the United States is:

1. A combustion chamber comprising an elongated tubular shell defining a combination space, a plurality of fuel injectors mounted in said shell, a plurality of air-admitting louvers in said shell, a plurality of apertures in said shell for admitting combustion air to the combustion space, and a plurality of tubes secured across said air apertures and projecting into said combustion space at right angles to the longitudinal axis of said shell, each tube having a longitudinal slot opening toward the fuel injectors whereby combustion air exiting from the slots provides flame protection for said tubes.

2. In a combustion apparatus, a wall structure defining an elongated combustion chamber having an enlarged primary section, a plurality of fuel injectors in the primary section of said wall structure, a plurality of apertures in said wall structure for admitting combustion-supporting fluid, some of said apertures being in pairs oppositely disposed across the longitudinal axis of said chamber, a plurality of tubes secured across said apertures and extending into said chamber at right angles to the longitudinal axis of said chamber, and a hollow strut supporting said wall structure and secured across each pair of oppositely disposed apertures, each tube and strut having a longitudinal slot opening toward the primary section end of said chamber.

3. In a combustion apparatus, a wall structure defining an elongated combustion chamber having an enlarged primary section, a plurality of fuel injectors in the primary section of said chamber, a plurality of apertures in said wall structure for admitting combustion air, and a plurality of stub tubes secured across said apertures and extending into said chamber at right angles to the longitudinal axis of said chamber, the interior end of each tube having a longitudinal slot therein opening toward the primary section end of said chamber.

4. In a combustion apparatus, a wall structure defining an elongated combustion chamber having an enlarged primary section, a plurality of fuel injectors in the primary section end of said chamber, a plurality of apertures in said wall structure for admitting combustion air, some of said apertures being in pairs oppositely disposed across the longitudinal axis of said chamber, and a strut supporting said wall structure and secured across each pair of oppositely disposed apertures, each of said struts being hollow and having a longitudinal slot opening toward the primary section end of said chamber.

References Cited in the file of this patent

UNITED STATES PATENTS

| | | |
|---|---|---|
| 1,793,640 | Schilling | Feb. 24, 1931 |
| 2,458,497 | Bailey | Jan. 11, 1949 |
| 2,552,492 | Nathan | May 8, 1951 |
| 2,579,614 | Ray | Dec. 25, 1951 |
| 2,618,928 | Nathan | Nov. 25, 1952 |
| 2,637,974 | Nathan | May 12, 1953 |
| 2,667,033 | Ashwood | Jan. 26, 1954 |

FOREIGN PATENTS

| | | |
|---|---|---|
| 148,801 | Australia | May 3, 1951 |